US005347301A

United States Patent [19]

Kawanishi et al.

[11] Patent Number: 5,347,301

[45] **Date of Patent: * Sep. 13, 1994**

[54] TRANSFER-TYPE ELECTROTHERMOGRAPHIC RECORDING METHOD AND RECORDING MEDIUM FOR USE WITH THE SAME

[75] Inventors: Toshiyuki Kawanishi; Kunichika Morohoshi; Masato Igarashi, all of Numazu, Japan

[73] Assignee: Ricoh Company, Ltd., Tokyo, Japan

[ * ] Notice: The portion of the term of this patent subsequent to Apr. 21, 2009 has been disclaimed.

[21] Appl. No.: 20,463

[22] Filed: Feb. 22, 1993

Related U.S. Application Data

[63] Continuation of Ser. No. 570,796, Aug. 22, 1990, abandoned.

[30] Foreign Application Priority Data

| | | | |
|---|---|---|---|
| Aug. 23, 1989 | [JP] | Japan | 1-214869 |
| Sep. 19, 1989 | [JP] | Japan | 1-240578 |
| Nov. 2, 1989 | [JP] | Japan | 1-284763 |
| Jan. 29, 1990 | [JP] | Japan | 2-16171 |

[51] Int. Cl.$^5$ .............. G01D 15/06

[52] U.S. Cl. .............. 346/153.1; 346/135.1

[58] Field of Search .............. 346/76 PH, 1.1, 135.1, 346/153.1, 126, 151; 430/945

[56] References Cited

U.S. PATENT DOCUMENTS

| | | | |
|---|---|---|---|
| 3,654,461 | 4/1972 | Conix et al. | 430/31 |
| 3,673,961 | 7/1972 | Jarvis | 101/465 |
| 3,762,944 | 10/1973 | Sloan et al. | 430/55 |
| 3,946,401 | 3/1976 | Young | 346/153.1 |
| 4,527,171 | 7/1985 | Takanashi et al. | 346/76 PH |
| 4,626,256 | 12/1986 | Kawasaki et al. | 428/413 |
| 4,636,815 | 1/1987 | Yuasa | 346/76 PH |
| 4,654,677 | 3/1987 | Tadauchi et al. | 346/76 PH |
| 4,814,891 | 3/1989 | Uchiyama et al. | 358/296 |
| 5,107,282 | 4/1992 | Morohoshi et al. | 346/153.1 |

*Primary Examiner*—Benjamin R. Fuller
*Assistant Examiner*—Randy W. Gibson
*Attorney, Agent, or Firm*—Oblon, Spivak, McClelland, Maier & Neustadt

[57] ABSTRACT

A transfer-type electrothermographic recording method comprising the steps of uniformly charging an electrothermographic recording layer which exhibits chargeability A at room temperature and chargeability B above room temperature, where the chargeabilities A and B are in the relationship of $A>B\geqq 0$, forming a latent electrostatic image by applying digital thermal signals which correspond to an original image, developing the latent electrostatic image with a toner of which polarity is the same as or opposite to the polarity of the electric charge of the latent electrostatic image to form a toner image, transferring the toner image to a receiving medium, and fixing the toner image transferred on the receiving medium; and a recording medium for use with the transfer-type electrothermographic recording method, comprising the above electrothermographic recording layer.

18 Claims, 4 Drawing Sheets

TRANSFER-TYPE ELECTROTHERMOGRAPHIC RECORDING METHOD AND RECORDING MEDIUM FOR USE WITH THE SAME

This application is a continuation of application Ser. No. 07/570,796, filed on Aug. 22, 1990, now abandoned.

BACKGROUND OF THE INVENTION

1. Field of the Invention

This invention relates to a transfer-type electrothermographic recording method and a recording mediun for use with the same.

2. Discussion of Background

The following methods have been conventionally known as electrothermographic recording methods:

(a) A recording method using a recording medium composed of an electroconductive support and a resinous layer formed thereon as disclosed in Japanese Patent Publication 35-14722. A resin of which electrical resistance is decreased when heated, such as polyvinyl chloride, polyethylene, polyester, polystyrene or a styrene - maleic acid copolymer is used for the resinous layer. The resinous layer is electrostatically charged and then heated by applying heat rays thereto in accordance with analogue signals corresponding to an original image, thereby forming an electrostatic image on the resinous layer.

(b) A recording method as disclosed in Japanese Patent Publication 38-14347. An electrothermographic material which is sufficiently transparent to heat rays, such as polyester, chlorinated polyvinyl chloride or vinyl chloride, is superposed on an original image and electrostatically charged. A latent electrostatic image is formed on the electrothermographic material by application of heat rays thereto, and reversely developed with a dry toner to form a visible toner image. The toner image is then fixed.

In the above methods, an infrared ray is applied to the recording medium which is placed in close contact with an original copy. Therefore, a large amount of energy is required for recording, and images with high resolution cannot be obtained. In addition, since these recording media are made of electrically chargeable materials, they are costly.

There has also been proposed a recording method in which a latent electrostatic image is formed on a photoconductor by application of light or on a dielectric material by applying, from a pin electrode, a pulse voltage with a polarity opposite to that of the electric charge on the dielectric material, and is developed with a toner. The toner image is transferred to a sheet of transfer paper and then fixed. This method however has shortcomings in that the process is complicated and an apparatus for use with the method is expensive.

SUMMARY OF THE INVENTION

Accordingly, an object of the present invention is to provide a transfer-type electrothermographic recording method which does not require complicated processes, by which digital information can be recorded on plain paper without causing deterioration of a recording medium used therewith.

Another object of the present invention is to provide a recording medium for use with the above transfer-type electrothermographic recording method, which can be produced inexpensively and has high durability.

The above objects of the present invention can be attained by a transfer-type electrothermographic recording method comprising the steps of uniformly charging an electrothermographic recording layer which exhibits chargeability A at room temperature and chargeability B above room temperature, where the chargeabilities A and B are in the relationship of $A>B\geqq 0$, forming an electrostatic latent image by applying digital thermal signals which correspond to an original image, developing the latent electrostatic image with a toner of which polarity is the same as or opposite to the polarity of the electric charge of the latent electrostatic image to form a toner image, transferring the toner image to a receiving medium, and fixing the toner image transferred on the receiving medium; and a recording medium for use with the transfer-type electrothermographic recording method, comprising an electrothermographic recording layer which exhibits chargeability A at room temperature and chargeability B above room temperature, where the chargeabilities A and B are in the relationship of $A>B\geqq 0$, preferably having a surface with a critical surface tension ($\gamma c$) of 35 dynes/cm or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The recording layer of the recording medium for use with the transfer-type electrothermographic recording method according to the present invention can be prepared by a thermoplastic resin which exhibits chargeability A at room temperature and chargeability B when heated above room temperature, where the chargeabilities A and B are in the relationship of $A>B\geqq 0$. In addition, it is preferable that the thermoplastic resin have a softening point of 30 to 200° C., preferably 60 to 150° C., and exhibit an electrical resistance of $1\times 10^{10}$ $\Omega\cdot$cm or more at room temperature and $1\times 10^{9}$ $\Omega\cdot$cm or less when heated above room temperature.

Specific examples of the thermoplastic resin usable for the recording layer include polyvinyl chloride, polyvinylidene chloride, cellulose acetate, polyvinyl alcohol, polyacetal, polycarbonate, a vinyl chloride - vinyl acetate copolymer, an ethylene - vinyl acetate copolymer, an acrylic polymer, a styrene-based polymer, polyester, polyamide, polyimide, polyethylene, polypropylene, a polypropylene-based polymer, perfluoroalkyl acrylate, a fluorinated-acryl - acryl copolymer, a silicone polymer such as a silicone resin, a silicone rubber, a silicone wax or a silicone oil, and a styrene - acryl copolymer. Of these, perfluoroalkyl acrylate, a fluorinated-acryl - acryl copolymer, polypropylene, a polypropylene-based polymer and a silicone polymer are preferred.

Examples of the above-mentioned polypropylene-based polymer include a polypropylene - ethylene copolymer, a polypropylene - butene copolymer, a polypropylene - ethylene - butene terpolymer, a polypropylene - vinylacetate copolymer, a polypropylene - ethylacrylate copolymer, and a polypropylene - ionomer copolymer.

It is preferable that the thickness of the electrothermographic recording layer be in the range of 5 to 100 μm, preferably 10 to 30 μm.

Referring now to the accompanying drawings, the present invention will be explained in more detail.

Figure 1A:
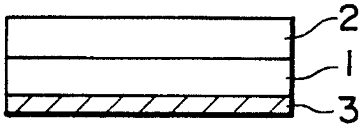
FIGS. 1*a* and 1*b* are the schematical cross-sectional views of transfer-type electrothermographic recording media according to the present invention.
Figure 1B:
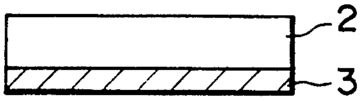
Figure 2A:
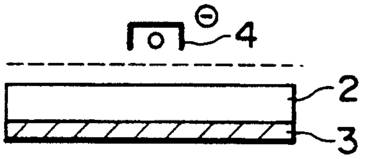
FIGS. 2*a* to 2*e* are the schematical illustrations showing the sequential processes of the transfer-type electrothermographic recording method according to the present invention.
Figure 2B:
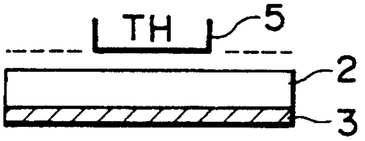
Figure 2C:
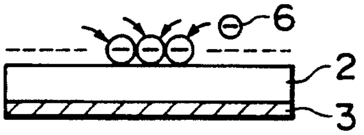
Figure 2D:
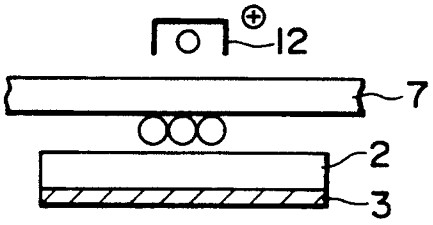
Figure 2E:
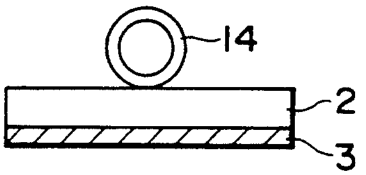
Figure 3A:
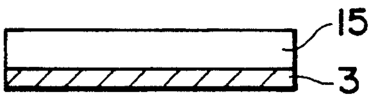
FIGS. 3*a* to 3*c* are the schematical cross-sectional views of transfer-type electrothermographic recording media having lubricating properties according to the present invention.
Figure 3B:
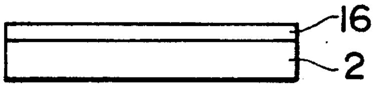
Figure 3C:
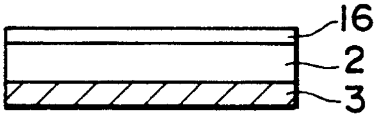

FIGS. 1*a* and 1*b* are the schematical cross-sectional views of typical embodiments of transfer-type electrothermographic recording media according to the present invention.

The recording medium shown in FIG. 1*a* is composed of a base layer 1, an electrothermographic recording layer 2 and an electroconductive layer 3. The electrothermographic recording layer 2 comprises a thermoplastic resin having a softening point of 30 to 200° C., preferably 60 to 150° C., as mentioned previously.

The base layer 1 which supports the electrothermographic recording layer 2 comprises a material having filmforming properties, such as polyester, vinyl chloride or polyethylene. It is possible to eliminate the base layer 1 when a material having film-forming or self-supporting properties is used for the recording layer 2.

It is better to form the electroconductive layer 3 on the back surface (opposite to the surface on which is overlaid the recording layer 2) of the base layer 1 in order to uniformly charge the recording layer 2. However, in the case where the recording layer 2 is charged on a metallic roller or plate, the electroconductive layer 3 is not necessarily required.

The recording medium shown in FIG. 1*b* is composed of an electrothermographic recording layer 2 provided with an electroconductive layer 3. An aluminum-deposition layer with a thickness of 100 to 2000 Å or a layer treated with an electroconductivity-imparting agent is used as the electroconductive layer 3. When a metallic drum or belt is used as the electroconductive layer 3, the recording medium can be prepared without using a base layer as shown in this figure.

The transfer-type electrothermographic recordig method according to the present invention will now be explained by referring to FIGS. 2*a* to 2*e*.

1. Charging Step (shown in FIG. 2*a*)

Corona charging is considered to be the best way to uniformly charge a recording layer. However, the following methods are also acceptable in the present invention: a method of applying an electric potential to a recording medium placed on a metallic roller; and a method of triboelectrically charging a recording layer by a brush having an organic or inorganic surface, or by a spongy roller.

In this figure, a recording layer 2 formed on an electroconductive layer 3 is negatively charged by a negative corona charger 4.

2. Heating Step (shown in FIG. 2*b*)

The recording layer 2 is heated by a thermal head 5, for instance, with a heating dot density of 8 dots/mm to 16 dots/mm, controlled by digital signals corresponding to an original image.

In the present invention, a serial or line thermal head of a floating type or a bias type which can avoid the reduction of the potential of the background of the recording medium when brought into contact therewith is used. A bias voltage may be applied to the thermal head, if necessary.

3. Developing Step (shown in FIG. 2*c*)

This step is the same as the conventional developing step which employs a dry-type toner or a wet-type developer.

The development step shown in this figure is a reversal development utilizing a repelling electric field generated between the remaining charges on the recording layer 2 and a toner 6 having the same polarity as the polarity of the charges.

4. Image Transfer and Fixing Steps (shown in FIG. 2*d*)

These steps are also the same as in the ordinary electrography. Namely, the toner image is transferred to a receiving medium (transfer paper) 7 with application of positive charge to the receiving medium by a positive corona charger 12.

In the case where a dry-type toner is employed for the development, the toner image is heated by a thermal roller for fixation. When a wet-type developer is used, it is enough to simply dry the existing liquid.

5. Cleaning Step (shown in FIG. 2*e*)

In order to obtain high quality images, the toner remaining on the surface of the recording layer 2 is cleaned by a cleaning roller 14.

By repeating a series of the above steps, digital information can be recorded on ordinary paper.

It is preferable that the surface of the electrothermographic recording layer have lubricating properties. When the recording layer has a surface which is deficient in lubricating properties, the thermal head cannot smoonthly move thereon. As a result, a latent electrostatic image cannot be accurately obtained, and the background of recorded images tends to be stained.

The lubricating properties can be imparted to a recording layer by any of the following methods:

(a) A lubricating layer made of a polymer with a critical surface tension (γc) of 35 dynes/cm or less, preferably 30 dynes/cm or less, such as a fluorinated-acryl - acryl copolymer, perfluoroalkyl acrylate, a silicone polymer or polyethylene, is formed on the recording layer, or these materials are employed in the recording layer;

(b) A lubricating layer made of a material with a critical surface tension (γc) of 35 dynes/cm or less, such as a fatty acid amide, for instance, stearic amide or behenic amide, or a wax, for instance, a polyethylene wax, is provided on the surface of the recording layer;

(c) A lubricant is incorporated into the recording layer to make the friction coefficient of the surface thereof 0.6 or less, preferably 0.5 or less.

Examples of the lubricant include inorganic fine powders such as silica, calcium carbonate, graphite, molybdenum disulfide, tungsten disulfide, talc, alumina, kaolin, titanium dioxide, barium sulfate and zeolite, fine powders of organic materials such as polystyrene, polymethylmethacrylate, polytetrafluoroethylene, polyvinylidene fluoride, polyacrylonitrile, a benzoguanamine resin, a silicone resin, carboxymethyl cellulose and starch, higher fatty acid amides such as oleic amide, stearic amide, behenic amide, erucinic amide and elaidic amide, natural waxes, synthetic waxes and phosphoric esters; and (d) A lubricating layer containing the lubricant mentioned in the above item (c), having a friction coefficient of 0.6 or less, preferably 0.5 or less, is provided on the surface of the recording layer.

Specific examples of an electrothermographic recording medium having such lubricating properties are shown in FIGS. **3*a*–3*c* and FIGS. 4*a*–4*d***.

FIG. **3*a* is a schematical cross-sectional view of a transfer-type electrothermographic recording medium in which a recording layer 15 having lubricating properties is formed on an electroconductive layer 3**.

More specifically, a recording layer with a critical surface tension (γc) of 35 dyne/cm or less preferably 30 dyne/cm or less, is formed on an electroconductive layer such as an aluminum plate. The electroconductive layer can be eliminated when the recording layer is charged on a metallic drum.

FIG. **3*b* is a schematical cross-sectional view of a transfer-type electrothermographic recording medium which is composed of a recording layer 2 and a lubricating layer 16** formed thereon.

More specifically, a lubricating layer comprising stearic amide, behenic amide or a polyethylene wax is formed on the surface of the recording layer 2, which also serves as a base layer, made of polyethylene, polypropylene, polyester, polyvinyl chloride, polyvinylidene chloride, cellulose acetate, polycarbonate, nylon, polyvinyl alcohol, polyimide or aromatic polyamide.

FIG. **3*c* is a schematical cross-sectional view of a transfer-type electrothermographic recording medium in which a lubricating layer 16 is formed on a recording layer 2 backed with an electroconductive layer 3**.

The recording medium of this type can be prepared by providing an electroconductive layer 3, such as an aluminumdeposition layer or an ion-treated layer, on the back surface of the recording layer 2 of the recording medium as shown in FIG. **3*b***.

FIGS. **4*a* to 4*d*** are schematical cross-sectional views of transfer-type electrothermographic recording media comprising the previously-mentioned lubricant.

Figure 4A:
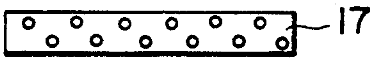
FIG. 4*a* to 4*d* are the schematical cross-sectional views of another transfer-type electrothermographic recording media having lubricating properties according to the present invention.
Figure 4B:
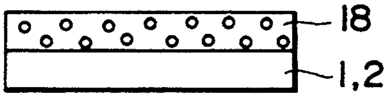
Figure 4C:
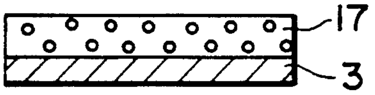
Figure 4D:
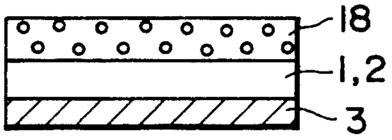

FIG. **4*a* shows a recording medium which is composed of a single recording layer 17 comprising the lubricant; FIG. 4*b* shows a recording medium, in which a layer 18 comprising the lubricant is formed on a recording layer 1,2 which also serves as a base layer; FIG. 4*c* shows a recording medium composed of a recording layer 17 comprising the lubricant and an electroconductive layer 3; and FIG. 4*d* shows a recording medium which is prepared by providing an electroconductive layer 3 on the back surface of the recording layer 1,2 of the recording medium as shown in FIG. 4*b***.

Other features of this invention will become apparent in the course of the following description of exemplary embodiments, which are given for illustration of the invention and are not intended to be limiting thereof.

EXAMPLE 1

Figure 5:
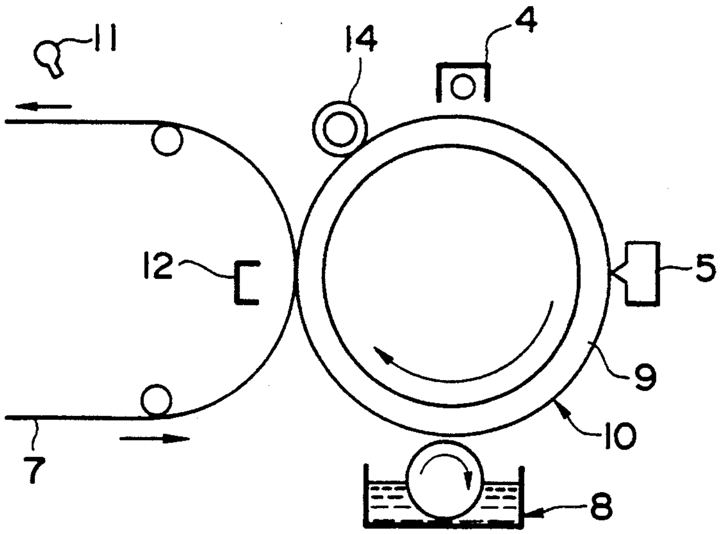
FIGS. 5 to 8 are the schematical illustrations of apparatus which are used for attaining the transfer-type electrothermographic recording method according to the present invention.

An electrothermographic recording layer with a thickness of 10 μm and a critical surface tension (γc) of 15 dynes/cm, made of a copolymer of fluorinated-acrylate (50 wt. %) and methylmethacrylate (50 wt. %) having a softening point of 140° C. was formed on an aluminum drum 9 in an apparatus as shown in FIG. 5.

Thus, transfer-type electrothermographic recording medium No. 1 according to the present invention was obtained, which is shown as a recording medium 10 in FIG. 5.

The recording medium 10 was charged by applying a voltage of −5 kV by a negative corona charger 4 to make the surface potential thereof −200 V. To the charged recording medium 10, a thermal signal (image signal) with a thermal energy of 0.5 mJ/dot was applied by a line-type thermal head 5 (8 dots/mm) with a width of 220 mm to form a latent electrostatic image thereon. The latent electrostatic image was developed with a liquid toner having a negative polarity for a plain paper copier (hereinafter referred to as PPC) (made by Ricoh Company, Ltd.) in a wet-type developing area 8. The resulting toner image was transferred to a transfer paper 7 (Trademark "Ricoh Type 6000", made by Ricoh Company, Ltd.) for a PPC under application of positive charge to the paper by a positive corona charger 12. The transferred image was thermally fixed by a hot-air fan 11. The toner remaining on the recording medium was cleaned by a cleaning roller 14 made of an electroconductive rubber.

The optical density of the image thus obtained was measured. The background of the recorded image was visually observed whether or not the background was stained. Furthermore, the cleanness of the reocrding medium after the cleaning was also observed. The results are shown in Table 1.

EXAMPLE 2

Figure 6:
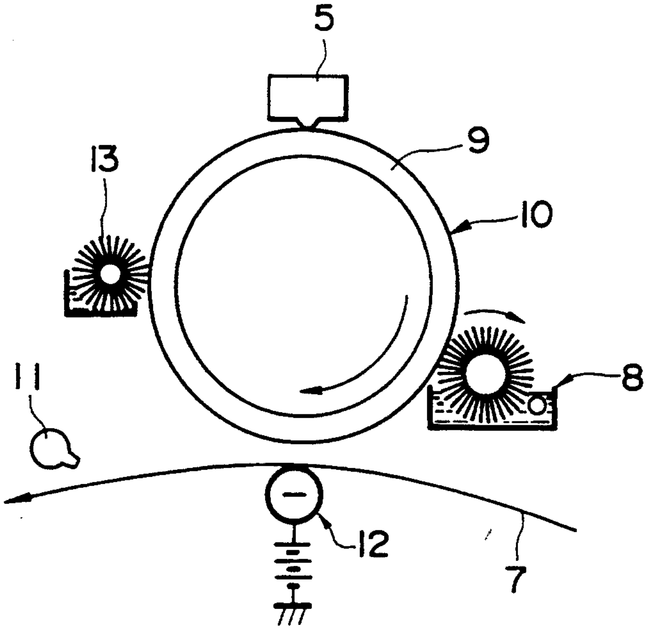

Transfer-type electrothermographic recording medium No. 1 prepared in Example 1 was evaluated by using an apparatus shown in FIG. 6 in the following manner:

The recording medium 10 was charged by a charging roller 13 as the recording medium 10 was rotated. The charging roller 13 also served as a cleaning roller. An image signal with a thermal energy of of 0.5 mJ/dot was applied to the charged recording medium by a thermal head 5 (8 dots/mm) with a width of 220 mm to form a latent electrostatic image thereon. The latent electrostatic image was developed with the same toner as used in Example 1 in a wet-type development unit 8 to form a toner image. The resulting toner image was transferred to a transfer paper 7 for a PPC under application of positive charge to the paper by a positive corona charger 12. The transferred image was thermally fixed by a hot-air fan 11. The toner remaining on the recording medium was cleaned by the roller 13 which was a spongy roller made of urethane, impregnated with a carrier liquid of the liquid developer (isoparaffin) used. The charging and the cleaning of the recording medium therefore can be conducted at the same time in the apparatus shown in FIG. 6.

The optical density of the image thus obtained was measured. The background of the recorded image was visually observed whether or not the background was stained. Furthermore, the cleanness of the recording medium after the cleaning was also observed. The results are shown in Table 1.

EXAMPLE 3-7 AND COMPARATIVE EXAMPLES 1-2

The procedure for Example 2 was repeated except that the electrothermographic recording medium 10 employed in Example 2 was replaced by the recording media including the electrothermographic layers with the following formulations.

| Examples | Formulation of Electrothermographic Recording Layer [Softening Point] | Critical Surfac Tension (γc) (dynes/cm) |
|---|---|---|
| Example 3 | Fluorinated-acrylate (50 wt. %) Hydroxyethylmethacrylate (50 wt. %) [100° C.] | 14 |
| Example 4 | Fluorinated-acrylate (25 wt. %) Hydroxyethylmethacrylate (75 wt. %) [110° C.] | 18 |
| Example 5 | Fluorinated-acrylate (30 wt. %) Methylmethacrylate (70 wt. %) [190° C.] | 20 |
| Example 6 | Fluorinated-acrylate (30 wt. %) Isobutylmethacrylate (70 wt. %) [120° C.] | 22 |
| Example 7 | Fluorinated-acrylate (30 wt. %) 2-Ethylhexylmethacrylate (70 wt. %) [30° C.] | 24 |
| Comparative Example 1 | Polytetrafluoroethylene (Teflon) (100 wt. %) [260° C.] | 19 |
| Comparative Example 2 | Polymethylmethacrylate (100 wt. %) [170° C.] | 39 |

Thus, transfer-type electrothermographic recording media Nos, 3 to 7 according to the present invention and comparative ones Nos, 1 and 2 were obtained.

The above recording media were evaluated in the same manner as in Example 2, The results are shown in Table 1.

TABLE 1

| Example | Optical Density | Stain of Background | Cleanness of Medium |
|---|---|---|---|
| 1 | 1.2 | none | good |
| 2 | 1.0 | none | good |
| 3 | 1.2 | none | good |
| 4 | 1.2 | none | good |
| 5 | 0.8 | none | good |
| 6 | 1.1 | none | good |
| 7 | 1.4 | slightly stained | practically acceptable |
| Comp. 1 | (*) | none | good |
| Comp. 2 | 1.4 | stained | poor |

Note) *: Recorded image was so vague that the optical density of the image was unmeasureable.

EXAMPLE 8

A polypropylene film with a thickness of 20 μm, serving as an electrothermographic recording layer, was desposited with aluminum to form an electroconductive layer with a thickness of 500 Å.

Thus, transfer-type electrothermographic recording medium No. 7 according to the present invention was obtained.

The recording medium thus obtained was superposed on the aluminum drum 9 of the apparatus shown in FIG. 5 and charged by applying a voltage of −7 kV by a negative corona charger 4 to make the surface potential thereof −800 V. To the charged recording medium, a thermal signal (image signal) with a thermal energy of 0.5 mJ/dot was applied by a line-type thermal head 5 (8 dots/mm) with a width of 220 mm to form a latent electrostatic image thereon. The latent electrostatic image was developed with a negative liquid toner for a commercially available PPC (made by Ricoh Company, Ltd.). The resulting toner image was transferred to a transfer paper 7 (Trademark "Ricoh Type 6000", made by Ricoh Company, Ltd.) for the PPC under application of a voltage of +6 kV to the transfer paper by the positive corona charger 12. The transferred image was thermally fixed by the hot-air fan 11. The toner remaining on the recording medium was cleaned by a cleaning roller 14 made of an electroconductive rubber.

The toner image thus obtained had an optical density of 1.3, and was sharp. The background of the image was not stained at all. The toner remaining on the recording medium was thoroughly cleaned by the cleaning roller 14, so that the recording medium could be used repeatedly.

EXAMPLE 9

An electrothermgraphic recording layer with a thickness of approximately 10 μm and a critical surface tension (γc) of 18 dynes/cm, made of a fluorinated-acryl - methylmethacrylate copolymer was prepared as transfer-type electrothermographic recording medium No. 8 according to the present invention, and was evaluated by using the apparatus shown in FIG. 6 in the following manner:

The recording medium was superposed on the aluminum drum 9 and was charged to make the surface potential thereof −300 V by a charging roller 13 made of a porous urethane rubber, which also served as a cleaning roller. An image signal with a thermal energy of 0.5 mJ/dot was applied to the charged recording layer by a thermal head 5 (8 dots/m) with a width of 220 mm to form a latent electrostatic image thereon. The latent electrostatic image was developed with the same toner as used in Example 1 to form a toner image. The resulting toner image was transferred to a transfer paper 7 for a PPC (made by Ricoh Company, Ltd.) under application of a voltage of +1.2 kV to the transfer paper by a positive corona charger 12. The transferred image was thermally fixed by the hot-air fan 11. The toner remaining on the recording medium was cleaned by the roller 13 which was a spongy roller made of urethane, impregnated with a carrier liquid of the liquid toner (isoparaffin).

The toner image thus obtained had an optical density of 1.0, and was sharp. The background of the image was not stained at all. The toner remaining on the recording medium was thoroughly cleaned by the cleaning roller 13.

EXAMPLE 10

A lubricating layer, made of a polyethylene wax, with a thickness of 3 μm and a critical surface tension (γc) of 31 dynes/cm was formed on a polyester film with a thickness of 9 μm, serving as an electrothermographic recording layer, backed with a 500 Å electroconductive aluminum-deposition layer.

Thus, transfer-type electrothermographic recording medium No. 9 according to the present invention was obtained.

The recording medium thus obtained was evaluated by using an apparatus shown in FIG. 7 in the following manner:

The recording medium was made in the form of a roll and wound around a feed roller 24. This recording medium was fed onto a platen drum 25 by the feed roller 24 and charged by applying a voltage of −7 kV by a negative corona charger 4 to make the surface potential thereof −500 V. To the charged recording medium, a thermal signal (image signal) with a thermal energy of 0.5 mJ/dot was applied by a thermal head 5 (8 dots/mm) with a width of 220 mm to form a latent electrostatic image thereon. The latent electrostatic image was developed with a dry toner containing a cyan powder having a negative polarity for a color copying machine (Trademark "Ricoh Color 5000", made by Ricoh Company, Ltd.) by a brush developing roller 20. The resulting toner image was transferred to a transfer paper 7 (Trademark "Ricoh Type 6000", made by Ricoh Company, Ltd.) for a PPC under application of a voltage of +6 kV to the transfer paper by a positive corona charger 12. The transferred image was fixed by an image fixing roller 28.

The toner image thus obtained had an optical density of 1.4, and was sharp. The background of the image was not stained at all.

EXAMPLE 11

A lubricating layer with a thickness of 2 μm, made of behenic amide having a critical surface tension (γc) of 29 dynes/cm, was formed on a polypropylene film with a thickness of 20 μm, serving as an electrothermographic recording layer.

Thus, transfer-type electrothermographic recording medium No. 10 according to the present invention was obtained.

Figure 7:
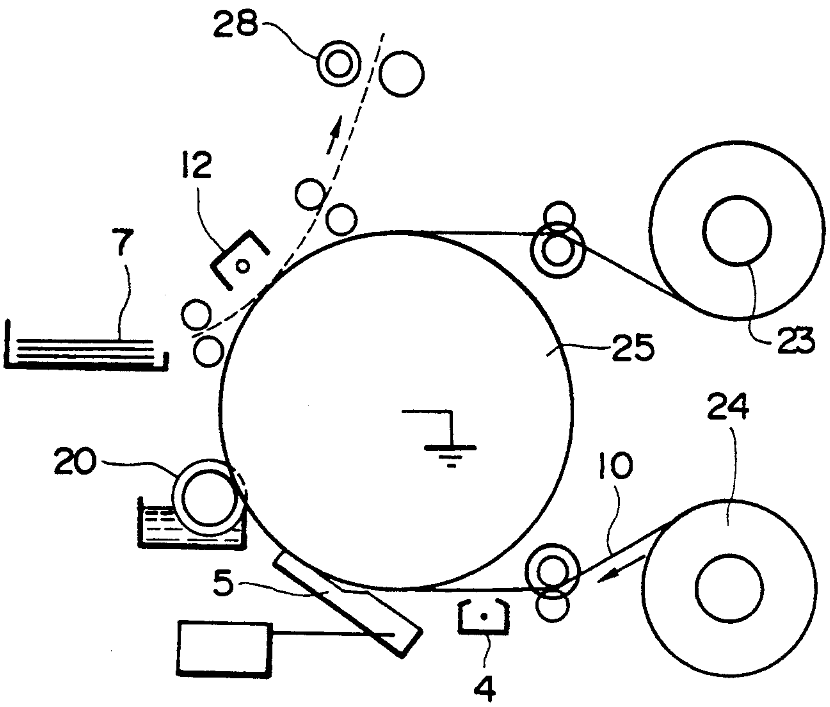

This recording medium was made in the form of a roll and wound around the feed roller 24 in the apparatus shown in FIG. 7 and was evaluated in the same manner as in Example 10 by use of the apparatus except that image formation was performed with the surface potential of the recording medium was set at −600 V.

The toner image obtained had an optical density of 1.5, and was sharp. The background of the image was not stained at all.

EXAMPLE 12

A lubricating layer with a thickness of 2 μm, made of a stearic amide having a critical surface tension (γc) of 32 dynes/cm, was formed on a polypropylene film with a thickness of 20 μm, serving as an electrothermographic recording layer.

Thus, transfer-type electrothermographic recording medium No. 11 according to the present invention was obtained.

The recording medium thus obtained was evaluated in the same manner as in Example 11.

The toner image obtained had an optical density of 1.5, and was sharp. The background of the image was not stained at all.

EXAMPLE 13

A polypropylene film with a thickness of 20 μm containing 0.15 wt. % of erucinic amide having a critical surface tension of 34 dynes/cm, serving as an electrothermographic recording layer, was prepared as transfer-type electrothermographic recording medium No. 12 according to the present invention.

This recording medium was diretly wound around the aluminum drum 9 in the apparatus shown in FIG. 5. The recording layer was charged by applying a voltage of −6 kV by the negative corona charger 4 to make the surface potential thereof −500 V. To the charged recording layer, a thermal signal (image signal) with a thermal energy of 0.5 mJ/dot was applied by a line-type thermal head 5 (8 dots/mm) with a width of 220 mm to form a latent electrostatic image thereon. The latent electrostatic image was developed with a negative liquid toner for a commercially available PPC (made by Ricoh Company, Ltd.). The resulting toner image was transferred to a transfer paper 7 (Trademark "Ricoh Type 6000", made by Ricoh Company, Ltd.) for the PPC under application of a voltage of +6 kV to the transfer paper by the positive corona charger 12. The transferred image was thermally fixed by the hot-air fan 11. The toner remaining on the recording medium was cleaned by the cleaning roller 14 made of an electroconductive rubber.

The toner image thus obtained had an optical density of 1.2, and was sharp. The background of the image was not stained at all.

EXAMPLE 14

A polyester resin film with a thickness of approximately 1 μm containing 5 wt. % of silica having a friction coefficient of 0.4, serving as an electrothermographic recording layer, was formed on a polyester film with a thickness of 50 μm backed with a 500 Å aluminum-deposition layer, serving as a base layer provided with an electroconductive layer.

Thus, transfer-type electrothermographic recording medium No. 13 according to the present invention was obtained.

The recording medium thus obtained was evaluated by using the apparatus shown in FIG. 5 in the same manner as in Example 13.

The toner image obtained had an optical density of 1.3, and was sharp. The background of the image was not stained at all.

EXAMPLE 15

A low-density polyethylene film with a thickness of 25 μm containing 0.05 wt. % of oleic amide having a critical surface tension of 33 dynes/cm, serving as an electrothermographic recording layer, was prepared as transfer-type electrothermographic recording medium No. 14 according to the present invention.

Figure 8:
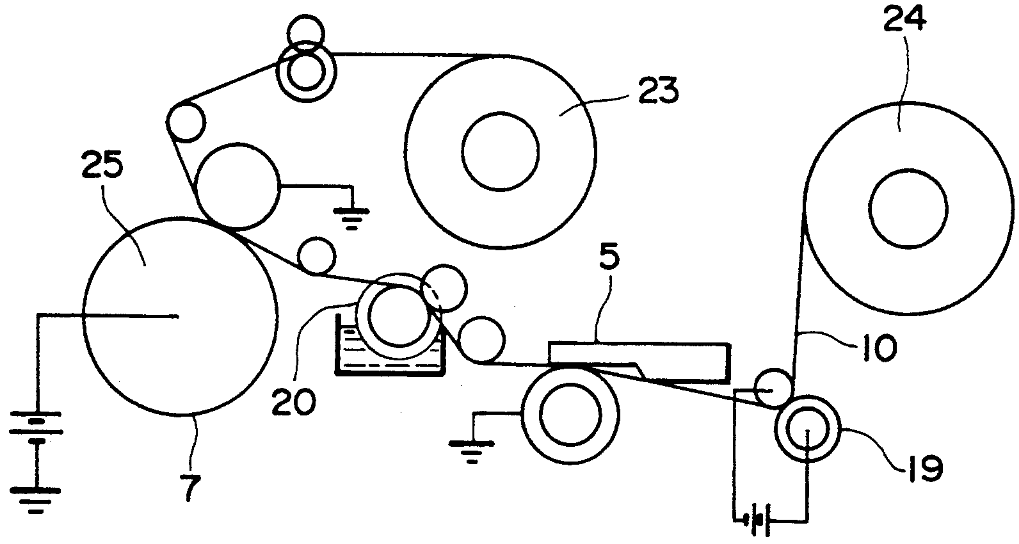

The thus prepared recording medium was made in the form of a roll and evaluated by use of an apparatus as shown in FIG. 8.

The recording medium was wound around a feed roller 24 and fed onto a platen drum 25 via a charging roller 19 made of an electroconductive rubber, a thermal head 5 (8 dots/mm) and a development roller 20, and transported up to a take-up roller 23 as shown in FIG. 8. A recording layer 10 of this recording medium was charged by applying a voltage of −1.2 kV by the charging roller 19 to make the surface potential thereof −700 V. To the charged recording layer, a thermal signal (image signal) with a thermal energy of 0.5 mJ/dot was applied by the thermal head 5 with a width of 220 mm to form a latent electrostatic image thereon. The latent electrostatic image was developed with a liquid toner by the development roller 20. The resulting toner image was transferred to a transfer paper 7 (Trademark "Ricoh Type 6000", made by Ricoh Company, Ltd.) under application of a voltage of +1.0 kV to the transfer paper° The transferred image was thermally fixed.

The toner image thus obtained had an optical density of 1.2, and was sharp. The background of the image was not stained at all.

EXAMPLE 16

The procedure for Example 7 was repeated except that the surface potential of the recording medium was set at −600 V and a thermal signal (image signal) with a thermal energy of 0.5 mJ/dot was applied by a line-type thermal head 5 (8 dots/mm) with a width of 220 mm under application of a bias voltage of −600 V to the thermal head. The surface potential in the thermal-signal-applied area of the recording medium was about −50 V and the surface potential in the background thereof was maintained at −600 V without any decrease thereof during the recording process.

The toner image thus obtained had an optical density of 1.3, and was sharp. The background of the image was not stained at all.

What is claimed is:

1. A transfer-type electrothermographic recording method comprising the steps of:

uniformly charging an electrothermographic recording layer of a recording medium, which exhibits chargeability A at room temperature and chargeability B above room temperature, where the chargeability A and B are in a relationship of $A>B\geqq 0$;

forming a latent electrostatic image by applying digital thermal signals which correspond to an original image by a thermal head under an application of a bias voltage;

developing said latent electrostatic image with a toner of which polarity is the same as or opposite to the polarity of said latent electrostatic image to form a toner image;

transferring said toner image to a receiving medium; and fixing said toner image transferred on said receiving medium.

2. The transfer-type electrothermographic recording method as claimed in claim 1, wherein said electrothermographic recording layer comprises a material selected from the group consisting of polyvinyl chloride, polyvinylidene chloride, cellulose acetate, polyvinyl alcohol, polyacetal, polycarbonate, a vinyl chloride - vinyl acetate copolymer, an ethylene vinyl acetate copolymer, an acrylic polymer, a styrene-based polymer, polyester, polyamide, polyimide, polyethylene, polypropylene, a polypropylene - based polymer, a perfluoroalkyl acrylate, a fluorinated-acryl - acryl copolymer, a silicone resin, a silicone rubber, a silicone wax, a silicone oil, and a styrene - acryl copolymer.

3. The transfer-type electrothermographic recording method as claimed in claim 1, wherein said digital thermal signals are applied by a thermal head which can yield a latent electrostatic image without reducing the electric potential of the background thereof even when brought into contact with the background.

4. The transfer-type electrothermographic recording method as claimed in claim 1, wherein said latent electrostatic image is developed with a toner with the same polarity as that of said latent electrostatic image.

5. The transfer-type electrothermographic recording method as claimed in claim 1, wherein said latent electrostatic image is developed with a toner with the opposite polarity to that of said latent electrostatic image.

6. The transfer-type electrothermographic recording method as claimed in claim 1, wherein said recording medium consists essentially of said electrothermographic recording layer comprising a thermoplastic resin and a lubricant selected from the group consisting of silica, calcium carbonate, graphite, molybdenum disulfide, tungsten disulfide, talc, alumina, kaolin, titanium dioxide, barium sulfate, zeolite, polystyrene, polymethylmethacrylate, polytetrafluoroethylene, polyvinylidene fluoride, polyacrylonitrile, a benzoguanamine resin, a silicone resin, carboxymethyl cellulose, starch, oleic amide, stearic amide, behenic amide, erucinic amide, elaidic amide, natural waxes, synthetic waxes and phosphoric esters incorporated into said recording layer.

7. The transfer-type electrothermographic recording method as claimed in claim 6, wherein said electrothermographic recording layer has a surface with a critical surface tension (γc) of 35 dynes/cm or less.

8. The transfer-type electrothermographic recording method as claimed in claim 6, wherein said electrothermographic recording layer comprises a material selected from the group consisting of polyvinyl chloride, polyvinylidene chloride, cellulose acetate, polyvinyl alcohol, polyacetal, polycarbonate, a vinyl chloride - vinyl acetate copolymer, an ethylene - vinyl acetate copolymer, an acrylic polymer, a styrene-based polymer, polyester, polyamide, polyimide, polyethylene, polypropylene, a polypropylene-based polymer, perfluoroalkyl acrylate, a fluorinated-acryl - acryl copolymer, a silicone resin, a silicone rubber, a silicone wax, a silicone oil, and a styrene - acryl copolymer.

9. The transfer-type electrothermographic recording method as claimed in claim 6, wherein said electrothermographic recording layer has a thickness in the range of 5 μm to 100 μm.

10. The transfer-type electrothermographic recording method as claimed in claim 6, wherein said recording medium further consists essentially of at least one of a base layer and an electroconductive layer, on which said electrothermographic recording layer is supported.

11. The transfer-type electrothermographic recording methods claimed in claim 1 wherein said recording medium consists essentially of said electrothermographic recording layer and a lubricating layer which layer comprises a lubricant selected from the group consisting of silica, calcium carbonate, graphite, molybdenum disulfide, tungsten disulfide, talc, alumina, kaolin, titanium dioxide, barium sulfate, zeolite, polystyrene, polymethylmethacrylate, polytetrafluoroethylene, polyvinylidene fluoride, polyacrylonitrile, a benzoguanamine resin, a silicone resin, carbonxymethyl cellulose, starch, oleic amide, stearic amide, behenic amide, erucinic amide, elaidic amide, natural waxes, synthetic waxes, phosphoric esters, fluorinated-acryl - acryl copolymer, perfluoroalkyl acrylate, a silicone polymer and polyethylene on said electrothermographic recording layer.

12. The transfer-type electrothermographic recording method as claimed in claim 11, wherein said lubricating layer comprises a polymer or a material having a critical surface tension (γc) of 35 dynes/cm or less.

13. The transfer-type electrothermographic recording method as claimed in claim 17, wherein said polymer is selected from the group consisting of a fluorinated-acryl - acryl copolymer, perfluoroalkyl acrylate, a silicone polymer and polyethylene.

14. The transfer-type electrothermographic recording method a claimed in claim 12, wherein said material is selected from the group consisting of stearic amide, behenic amide and a polyethylene wax.

15. The transfer-type electrothermographic recording method as claimed in claim 11, wherein said recording medium further consists essentially of at least one of a base layer and an electroconductive layer, on which said electrothermographic recording layer is supported.

16. The transfer-type electrothermographic recording method as claimed in claim 15, wherein said lubricating layer comprises a polymer cr a material having a critical surface tension (γc) of 35 dyne/cm or less.

17. The transfer-type electrothermographic recording method as claimed in claim 16, wherein said polymer is selected from the group consisting of a fluorinated-acryl - acryl copolymer, perfluoroalkyl acrylate, a silicone polymer and polyethylene.

18. The transfer-type electrothermographic recording method as claimed in claim 16, wherein said material is selected from the group consisting of stearic amide, behenic amide and a polyethylene wax.

* * * * *

UNITED STATES PATENT AND TRADEMARK OFFICE

CERTIFICATE OF CORRECTION

PATENT NO. : 5,347,301

Page 1 of 2

DATED : September 13, 1994

INVENTOR(S) : Toshiyuki KAWANISHI, et al.

It is certified that error appears in the above-identified patent and that said Letters Patent is hereby corrected as shown below:

Column 1, line 12, "mediun" should read --medium--.

Column 3, line 38,"filmforming" should read --film-forming--
line 58, "recordig" should read --recording--.

Column 4, line 52, "smoonthly" should read --smoothly--.

Column 5, line 28, "cm or less preferably" should read --cm or less, preferably--

Column 6, line 37, "reocrding" should read --recording--.

Column 7, line 5, "Example 3-7" should read --Examples 3-7--
line 14, "Critical Surfac" should read --Critical Surface--.
line 40, "Nos," should read --Nos.--.
line 43, "Example 2," should read --Example 2.--.

UNITED STATES PATENT AND TRADEMARK OFFICE

CERTIFICATE OF CORRECTION

PATENT NO. : 5,347,301

DATED : September 13, 1994

INVENTOR(S) : Toshiyuki KAWANISHI, et al.

It is certified that error appears in the above-identified patent and that said Letters Patent is hereby corrected as shown below:

Column 9, line 45, "the recording medium was set at" should read --the recording medium set at--.

Column 10, line 4, "diretly" should read --directly--.

Column 11, line 5, "transfer paper°" should read --transfer paper.--.

Column 13, line 2, "Claim 17" should read --Claim 12--.

Column 14, line 3, "cr" should read --or--.

Signed and Sealed this

Third Day of October, 1995

Attest:

Bruce Lehman

BRUCE LEHMAN

*Attesting Officer*

*Commissioner of Patents and Trademarks*